(12) United States Patent
Ickert

(10) Patent No.: US 8,825,569 B2
(45) Date of Patent: Sep. 2, 2014

(54) METHOD FOR AUTOMATICALLY TEACHING PARAMETERS

(75) Inventor: Lars Ickert, Kempten (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 258 days.

(21) Appl. No.: 13/495,948

(22) Filed: Jun. 13, 2012

(65) Prior Publication Data

US 2012/0323830 A1  Dec. 20, 2012

(30) Foreign Application Priority Data

Jun. 14, 2011  (DE) .......................... 10 2011 104 187

(51) Int. Cl.
*G06N 3/10* (2006.01)
*G05B 13/02* (2006.01)

(52) U.S. Cl.
CPC .............. *G06N 3/10* (2013.01); *G05B 13/0205* (2013.01)

USPC ............................................. 706/12; 706/45

(58) Field of Classification Search
None
See application file for complete search history.

(56) References Cited

FOREIGN PATENT DOCUMENTS

| DE | 3919848 A1 | 7/1990 |
|----|------------|--------|
| DE | 102006030434 A1 | 11/2007 |
| EP | 1536551 A1 | 6/2005 |
| WO | 9808759 A1 | 3/1998 |
| WO | 2007028685 A2 | 3/2007 |

OTHER PUBLICATIONS

Flexco, The Splice is Right for Cutting Conveyor Downtime, Process & Control, 2004, pp. 7-8.*

* cited by examiner

*Primary Examiner* — Wilbert L Starks
(74) *Attorney, Agent, or Firm* — Husch Blackwell LLP

(57) ABSTRACT

The invention relates to a method for automatically teaching parameters to a tray sealer, for example, position values, acceleration values and/or distances.

10 Claims, 6 Drawing Sheets

METHOD FOR AUTOMATICALLY TEACHING PARAMETERS

CROSS-REFERENCE TO RELATED APPLICATION

This application claims priority to German Application Number 102011104187.0 filed Jun. 14, 2011 to Lars Ickert entitled "Method For Automatically Teaching Parameters," currently pending, the entire disclosure of which is incorporated herein by reference.

TECHNICAL FIELD

The invention relates generally to a method for automatically teaching parameters to a tray sealer.

BACKGROUND

Tray sealers, such as those offered by Multivac Sepp Haggenmüller GmbH & Co. KG and its affiliated companies, are disclosed in DE 10 2008 030 510 A1. Tray sealers, which during the transport of trays are equipped with conveyor belts in the supply region upstream of the sealing station are, on one hand, flexible in the use of trays of different geometries and, on the other hand, the geometries must be known or be available to the controller in order to convey or position the individual trays by means of conveyor belts onto a collection belt at predetermined locations, if they are to be taken by a gripper system and a supplied to a sealing station.

To obtain high performance, belt velocities and belt accelerations can be adjusted by the operator at the machine controller. Adjustment of parameters such as belt velocities or belt accelerations by trial and error is often time-consuming for the operator. In this, adhesion of the tray bottom of the tray filled with a product on the belt surface of the conveyor belts is of great significance. This may also change during the production process due to increasing humidity or liquid product spillage, and positioning errors on the collection belt occur. The gripper system is then possibly no longer able to grip the trays and the tray sealer comes to a halt. A repeated change of various parameters by the operator during the entire process is therefore necessary to keep performance up or at a maximum. The adjustment parameters and the interrelationships or effects, respectively, when adjusting these parameters to the process are frequently hard to understand for the operator and it takes some attempts and time until a desired performance is adjusted with simultaneous high process reliability.

SUMMARY OF THE INVENTION

The object of the present invention is to increase the performance of a tray sealer.

This object is satisfied by a method having the features of claim 1. Advantageous developments of the invention are disclosed in the dependent claims.

The method according to the invention for automatically teaching parameters for the operation of a tray sealer (viz. learning the parameters, from the perspective of the tray sealer) comprises the following steps:
  activating a teaching program via a controller, for example, by the operator,
  moving at least one tray at a first acceleration to a first velocity in a direction opposite to a direction of production of the tray sealer by means of a collection belt,
  transferring the tray velocity-synchronously from the collection belt to a supply belt, which, relative to the direction of production, is disposed up-stream prior to the collection belt,
  detecting a position of the tray by means of a sensor which is provided along the collecting belt or the supply belt,
  processing routing information of the tray in the controller.

In this, the advantage lies in the tray sealer itself automatically performing the process which transports the tray from a position on the collection belt backwards to the supply line and is thereby detected by a sensor, so that the position of the tray on the belts is known to the controller. Prior to activation of the teaching program, the supply belt is to be freed of trays or to be cleared.

The method is particularly advantageous when comprising the following steps:
  moving at least one tray once or several times with a stage of movement in the direction of production and another stage of movement in a direction opposite to the direction of production, where at least at every second stage of movement (or generally after every $n^{th}$ stage), the maximum acceleration reached in this stage of movement is increased, and
  terminating the teaching phase, after an abort condition has been fulfilled, and receiving an acceleration value in the controller which was below the acceleration value at the termination.

Determining the maximum possible acceleration of the trays is crucial for increasing performance of the tray sealer in order to be able to be conveying as quickly as possible and thus as many trays as possible. In this, the allowable acceleration is primarily dependent upon the friction of the tray bottom on the supply and the collection belt. Friction is influenced by the weight force of the tray with the product, the lateral force due to the acceleration of the belts, and the friction coefficient between the belt surface and the tray bottom. The friction coefficient can change during the production period due to changes in humidity or accidental deposits of liquid product spillage on the belt which, for instance during the filling process, reach the tray edges and can then at least partially collect on a belt. These changes on the surface of the belt usually decrease the friction coefficient, and the trays can slip, especially during acceleration and de-acceleration, and thus change their position relative to the belt and are not correctly conveyed to the pickup position. The grippers in conventional systems were then no longer able to correctly grip the trays and there was downtime to rectify this situation.

In one embodiment, the abort condition for terminating the teaching phase is the presence of a positional deviation of the tray on the collecting belt or the supply belt, which is detected by means of the sensor, in order to thus automatically detect exceeding the maximum acceleration possible under the current conditions, not yet leading to a positional deviation.

Alternatively, the abort condition is a stop of the process triggered by the operator if an impermissible event was visually detected. In particular for liquid or pasty products, there can be product spillage from the tray even before the tray starts slipping on a belt. The operator can then terminate the teaching method.

Preferably, the following steps are provided:
  creating a state of the tray sealer in which one tray, or a group of trays, is released by a gripper unit comprising a gripper carriage and at least one gripper, so that the tray or the group of trays is located in a pickup location, and
  measuring the distance traveled by the tray from the pickup location to the sensor.

Since the pickup position of the trays from the collection belt is defined by the gripper unit, in order to pass the trays to the work station for sealing with a top film, it is advantageous to place the tray or the trays by means of the gripper unit onto the collection belt prior to activation of the teaching program. This can be accomplished by inserting the tray into a closed gripper in order to obtain the pickup location in the production direction. The relatively slow movement of the trays to the sensor in a direction opposite to the direction of production, and also beyond, leads to the determination of the distance traveled by the trays from the pickup location to the sensor. During normal operation, this distance is equal to the distance that the tray has to travel from the sensor to the pickup location and this leads to the target position of each tray, respectively.

Preferably, the distance traveled is processed in the controller and/or the front and rear side wall of the tray is detected by means of the sensor and a length is processed in the controller to preferentially determine the center of the tray. From the recorded signals of the sensor of two adjacent trays, the distance between the trays can be determined automatically. Previously it was common that, after a format change and modifications to the gripper unit, the value for the distance between the trays at the pickup location was determined by the operator from drawings or the like and entered manually at the input unit of the controller. The favorable automatic determination by the teaching program is a substantial facilitation for the operator.

In one embodiment of the invention, the gripper carriage moves to the pickup location for the tray above the collection belt, because manually shifting the gripper carriage against a stop in the direction of the collection belt frequently does not represent the best location. The controller positions the gripper carriage into an optimal pickup location across the known maximum distance of the carriage.

In a further improved embodiment, the tray filled with the product is placed in the closed gripper within the work station or into a tray carrier of the workstation. This makes it easier for the operator to place the trays in a prepared and unique position within the work station. The gripper can then with the trays move to the actual pickup location.

A further advantageous variant provides for the following steps:
- transferring the tray from the supply belt onto the collection belt or from the collection belt onto the supply belt, where this transfer comprises a velocity-synchronous and a velocity-asynchronous stage,
- repeated transfer of the tray between the collection belt and the supply belt with a velocity-synchronous stage further reduced during each change of direction or every other change of direction (generally every $n^{th}$ change of direction), until a positioning error of the tray is detected by the controller by means of the sensor, and
- terminating the teaching phase and receiving in the controller a value for the time or the distance of the velocity-synchronous stage, which is at least as large as the value taken at the termination of the teaching phase.

To even further increase performance of the tray sealer, the time during a transfer of a tray from the supply belt to the collection belt, in which the velocities of both belts is synchronized in order to secure the position of the trays also during belt transfers, should only be as long as necessary. The shorter the joint synchronization, the more flexible the individual belts can be controlled independently from each other with maximum efficiency. In various embodiments of the package bottom, it is no longer necessary to enter in the controller and use a measured outer dimension in the direction of production. A possible shorter velocity-synchronous stage during belt transfer can thus be determined automatically by the method according to the invention.

In order to receive a suitable value for the velocity-synchronous stage in the controller after termination of the teaching phase, the value received at the termination of the teaching phase is increased by at least 2%, and in one embodiment by 5% or the last value is taken at which the abort was not yet triggered. This ensures a reliable transfer of the tray during the belt transfer while simultaneously allowing a decrease of the velocity-synchronous stage with a suitable design of the tray bottom.

Taking the values into the controller can be performed automatically by the controller itself or confirmed by an operator at the display. In this, the operator has the possibility of changing the values prior to confirmation.

BRIEF DESCRIPTION OF THE DRAWINGS

In the following, an advantageous embodiment of the invention is further illustrated using a drawing.

Specifically.

Identical components are throughout the figures designated with the same reference numerals.

DETAILED DESCRIPTION OF THE INVENTION

Figure 1:
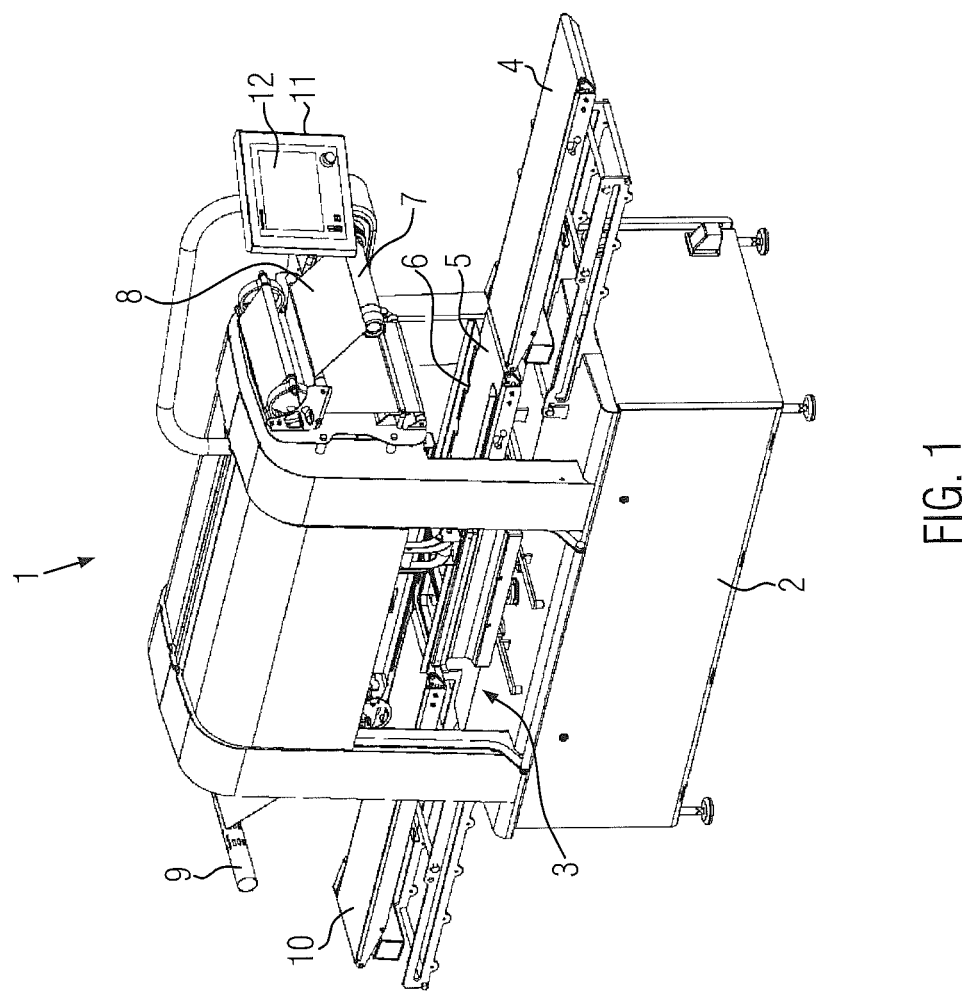
FIG. 1 shows a perspective view of a tray sealer in accordance with one embodiment of the present invention.

FIG. 1 shows a perspective view of a tray sealer 1 for operation with a method according to the invention. There is a work station 3 on a frame 2, in the present case, a gassing, sealing and cutting station. A supply belt 4 conveys trays filled with a product (not shown) and transfers them to a collection belt 5 on which the trays are positioned at a predetermined distance in a pickup location in order to be transferred by grippers 6 from the collection belt 5 to the work station 3. A top film 8 is drawn from a film dispenser 7 and likewise guided into the work station 3.

After evacuation and/or gassing of the trays with an exchange gas (MAP), the trays are sealed in an airtight manner with the top film 8. Subsequently or simultaneously, a cutting tool cuts out the trays from the cover film 8, thus separates the trays. The residual film lattice of the top film 8 is wound on a residual film winder 9. The sealed trays are placed on a discharge belt 10 after they have been conveyed out of the work station 3 by means of the gripper 6. A display device 11, which can also be the controller, visualizes the operations process and the operational status of the tray sealer 1 and allows the operator to operate the tray sealer 1 via a touch screen 12.

Figure 2:
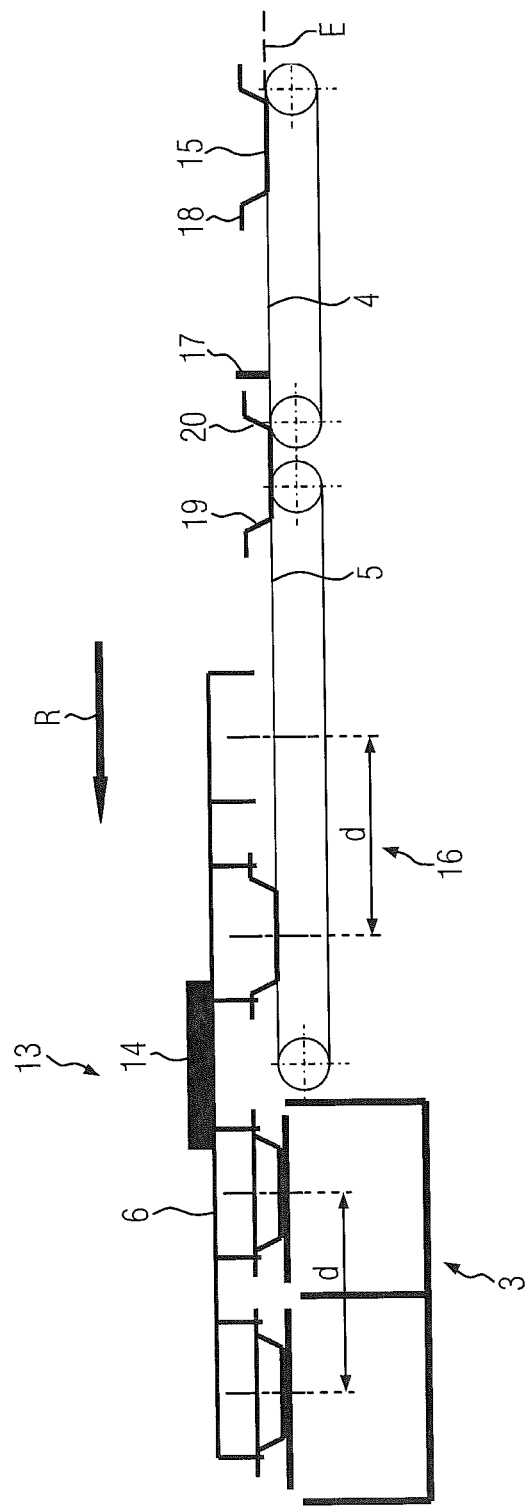
FIG. 2 shows a schematic side view with a supply belt, a collection belt, and a work station in accordance with one embodiment of the present invention.

FIG. 2 in a schematic side view in the direction of production R from right to the left shows the supply belt 4, the collection belt 5, and a gripper device 13 comprising a gripper carriage 14 and a gripper 6. Trays 15 are transferred onto the collection belt in a manner such that a predetermined distance d is created between two adjacent trays 15 and the trays come to lie in the pickup location 16 on the collection belt. The gripper 6 grips the trays 15 and the gripper carriage 14 moves the gripper 6 into the workstation 3.

The trays 15 on the supply belt 4 are detected by a sensor 17. At least the front side wall 19 is detected below the tray edge 18 and above the conveying plane E by the sensor 17 which is preferably designed as a light beam. For different embodiments of the tray 15, it may be necessary to design the sensor 17 vertically adjustable. When detecting the front 19 and the rear side wall 20 of a tray 15, the center of the tray 15 can be determined and the controller can perform positioning of the tray 15 on the belts 4, 5 using the tray center as a reference.

Figure 3:
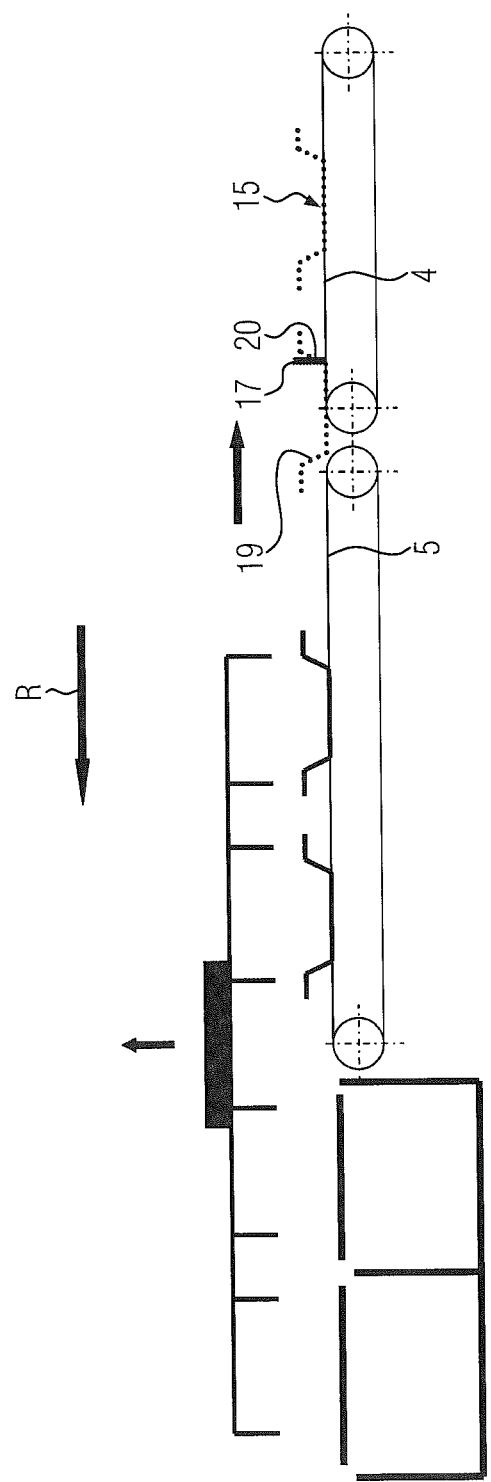
FIG. 3 shows a schematic side view during a teaching phase in accordance with one embodiment of the present invention.

FIG. 3 shows a phase of a method according to the invention at the start of the teaching. Two trays 15 on the collection belt 5 are located in the pickup location 16 and the gripper 6 is in a position in which it enables a movement of the trays on the collection belt 5. The two trays 15 are slowly moved by the collection belt 5 from the pickup location 16 in a direction opposite to the direction of production R, transferred velocity-synchronously onto the supply belt 4 which likewise runs in a direction opposite to the direction of production, until both respective side walls 19, 20 have been detected by the sensor 17. In this manner, the trays 15 and their position are detected and known to the controller.

Figure 4:
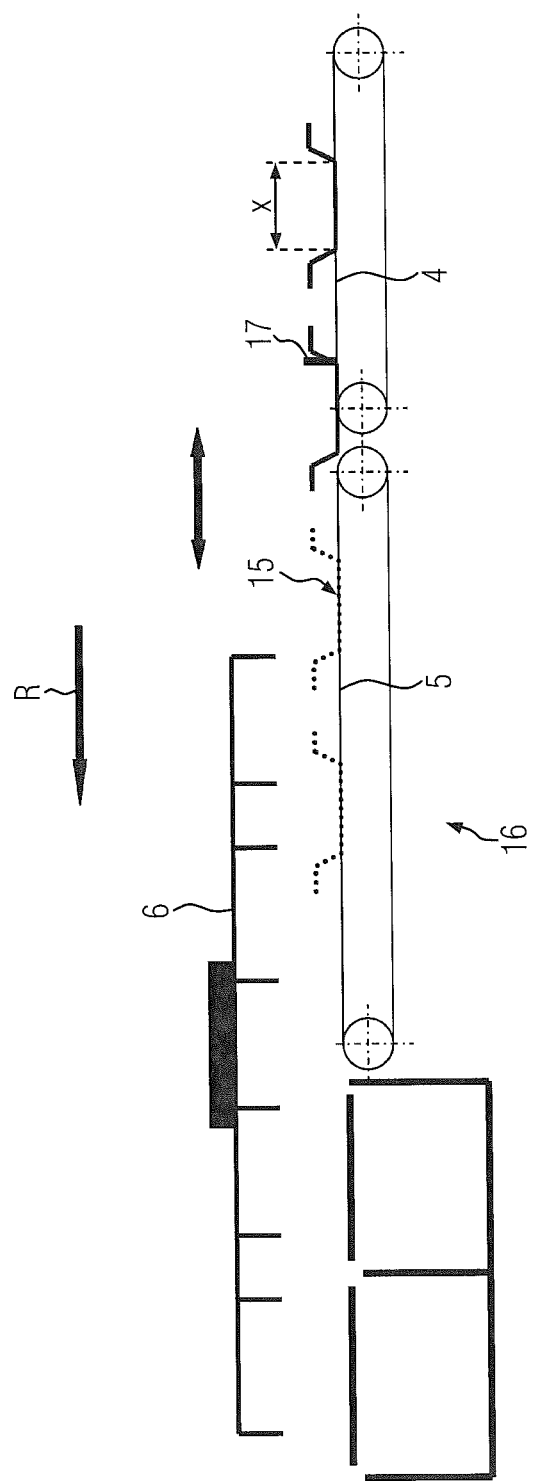
FIG. 4 shows a schematic side view during an embodiment of the teaching phase in accordance with one embodiment of the present invention.

FIG. 4 shows a phase of a method according to the invention for determining the maximum acceleration of the trays on the belts. The embodiment is not limited to moving a group of trays which is transportable by the gripper 6, but this can for reasons of space also be performed with only a single tray 15. In this, belt transfers can become obsolete if the individual tray 15 would be moved only on the supply belt 4.

In this embodiment, the two trays 15 are moved and again returned from a position to the right of the sensor 17 on the supply belt 4 to the pickup location 16 on the collection belt 5. At each change of direction in and/or against the direction of production R, the acceleration is continuously increased, and in one embodiment is increased by 5%. During the movement in a direction opposite to the direction of production, the trays 15 pass by the sensor 17 and the detected distance from the pickup location to the position at the sensor 17 is compared with the calculated theoretical value previously computed by the controller. The previously computed theoretical value preferably has a tolerance range that is permitted and can be inputted by the operator. The tolerance range depends on the configuration of the trays 15 and the gripper 6; bevels on the grippers 6 can for instance still precisely readjust the trays 15, should the position not be precisely correct. If this value matches, a further cycle of the tray movement follows with further increased acceleration. If the controller detects a positioning error of the tray when it passes the sensor 17, an abort occurs, and a value of acceleration lowered by 5% or 10%, relative to the acceleration of the last movement, is processed in the controller as a maximum value.

Figure 5:
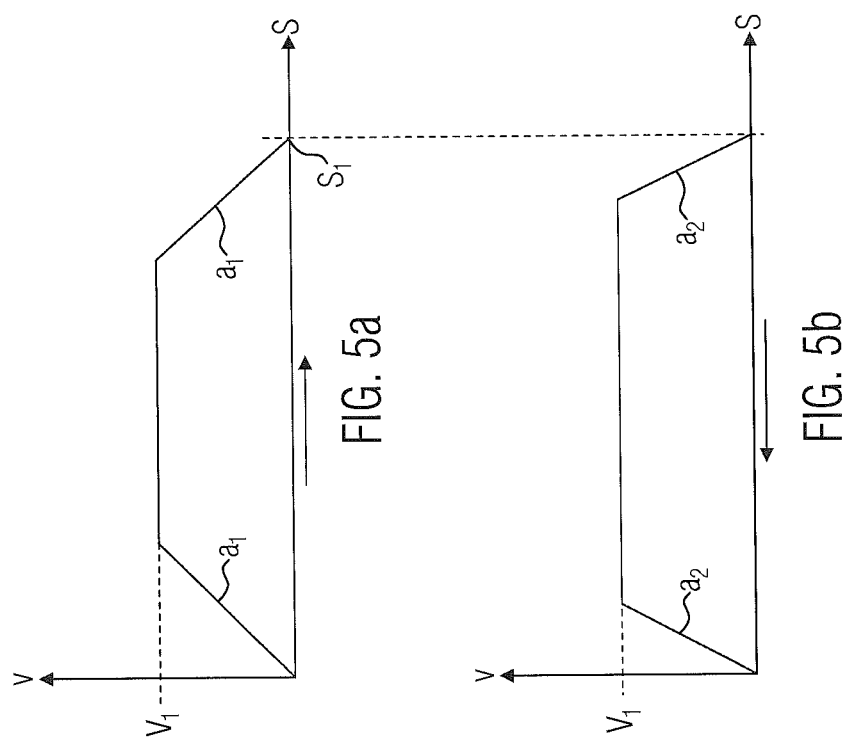
FIG. 5a shows a distance-velocity diagram with an acceleration for movement of the tray in a direction opposite to the direction of production in accordance with one embodiment of the present invention.
FIG. 5b shows a distance-velocity diagram with an increased acceleration for movement of the tray in the direction of production in accordance with one embodiment of the present invention.

FIG. 5a shows the movement profile of the tray 15 (in direction of the arrow towards the right) from the pickup position 16 in a position on the supply belt 4 with an acceleration a1 and a velocity v1, wherein the tray 15 travels a distance s1. FIG. 5b illustrates the movement profile after a reversal of direction (in the direction of the arrow towards the left), wherein the acceleration a2 is greater than the acceleration a1. In this, the tray 15 travels the same distance s1. The velocity v does not need to remain the same for different accelerations, it can for instance also increase.

This procedure for determining the maximum acceleration a subject to the present conditions can be repeated at a later time, if the conditions for tray conveying change during the operation of the tray sealer 1.

FIG. 4 also shows a procedure for determining the minimum velocity-synchronous stage during the belt transfer from the supply belt 4 to the collection belt 5 at a velocity v which was preferably reached at the maximum acceleration a. During the first belt transfer, the tray 15 having a tray bottom length x, being measured by the operator and entered into the controller, is transferred from the supply belt 4 to the collection belt 5 in a velocity-synchronous manner. After a change of direction, i.e. conveying the tray in the reverse direction from the collection belt 5 to the supply belt 4, the velocity-synchronous stage is reduced, meaning that both belts 4, 5 do not over the entire length x of the tray bottom run synchronously during the belt transfer. Despite a reduced distance with synchronously running belts 4, 5, the tray 15 can be moved safely across the belt transfer without loss of adhesion. If the velocity-synchronous stage of the path is reduced too much, then the tray 15 will slip on the belts 4, 5 and past the sensor 17 during a subsequent movement. This is detected by the controller, like with the above-described procedure for determining the maximum acceleration a, and the teaching process is terminated. The controller processes a value for the minimum velocity-synchronous stage for the following operation in the form of a length that is 5% to 10% higher than the value at the time of the abort. If the operator visually recognizes, for example, a twist or lateral displacement, then he can he terminate the teaching process.

Figure 6:
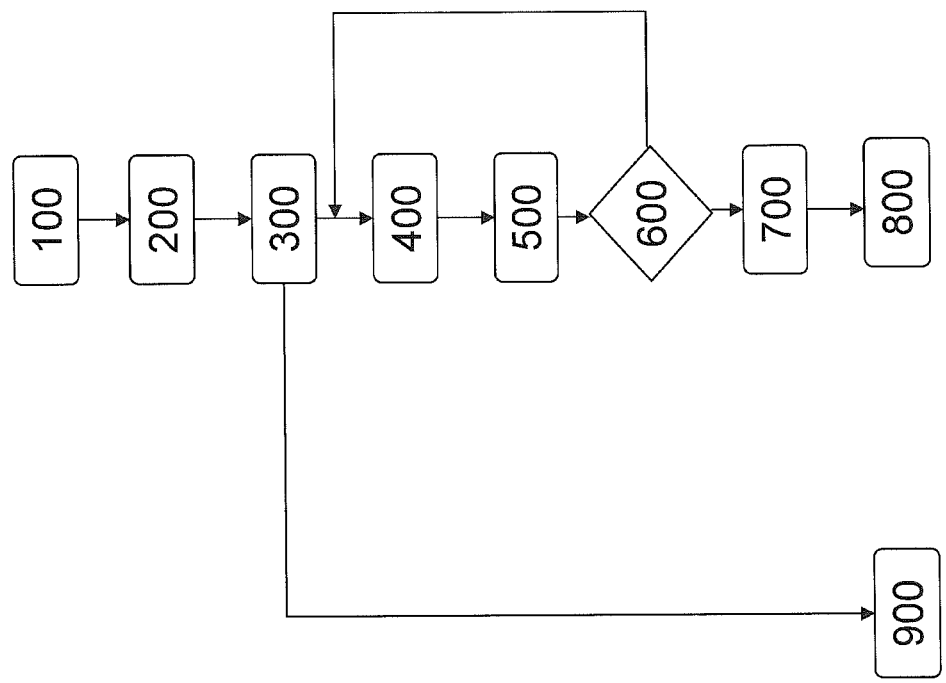
FIG. 6 shows a flow chart of a method sealer in accordance with one embodiment of the present invention.

FIG. 6 illustrates different phases of a method according to the invention using a flow chart. At the start at step 100, the teaching program is activated. This is followed by step 200 of moving the tray 15 from the pickup location 16 in a direction opposite to the direction of production R. In step 300, the tray 15 is detected by the sensor 17. The distance s traveled by the tray 15 from the pickup location 16 to the sensor 17 is transferred to the controller via the left path using step 900. Next, movement of the tray 15 is in step 400 in the direction of production R with increased acceleration. After a change of direction, there is a movement of the tray 15 in step 500 against the direction of production R with further increased acceleration. If in step 600 the sensor 17 detects the tray 15, then a comparison of the value detected by the sensor 17 and a previously computed setpoint value takes place. If there is no deviation, then steps 400, 500 and 600 are repeated. If, however, there is a deviation at step 600, then the teaching process is terminated with step 700, and the acceleration last indicated in step 400 is used with step 800 in the controller as the maximum value for the designated production.

The invention claimed is:

1. Method for automatically teaching parameters for operating a tray sealer, said method comprising the steps of:
   activating a teaching program via a controller,
   moving at least one tray at a first acceleration to a first velocity in a direction opposite to a direction of production of said tray sealer by means of a collection belt,
   transferring said tray in a velocity-synchronous manner from said collection belt to a supply belt, which relative to the direction of production is disposed up-stream to said collection belt, detecting a position of said tray by a sensor which is provided along said collection belt or said supply belt, and processing routing information of said tray in the controller.

2. Method according to claim 1 further comprising the follow steps:

moving said tray once or several times with a stage of movement in the direction of production and another stage of movement in a direction opposite to the direction of production, where at least at every second stage of movement, the maximum acceleration reached in this stage of movement is increased, and terminating a teaching phase after an abort condition has been fulfilled, and receiving an acceleration value in said controller which was below the acceleration value at the termination.

3. Method according to claim 2, wherein said abort condition is a positional deviation of said tray on said collection belt or said supply belt detected by said sensor.

4. Method according to claim 2, wherein said abort condition is a termination of a process triggered by the operator if an impermissible event was visually detected.

5. Method according to claim 1 further comprising the follow steps:

creating a state of said tray sealer in which said tray or a group of trays is released by a gripper unit comprising a gripper carriage and at least one gripper, so that said tray or said group of trays is in a pickup position, and measuring the distance traveled by said tray from said pickup location to said sensor.

6. Method according to claim 5, wherein said distance traveled is processed in said controller and wherein a front side wall and a rear side wall of said tray are detected by means of said sensor and wherein a length of said tray is processed in said controller to preferentially determine the center of said tray.

7. Method according to claim 6, wherein said gripper carriage moves to said pickup location for said tray above said collection belt.

8. Method according to claim 7, wherein said tray filled with a product is positioned in said closed gripper within a work station or said tray is positioned into a tray carrier of said work station.

9. Method according to claim 1 further comprising the follow steps:

transferring said tray from said supply belt onto said collection belt or from said collection belt onto said supply belt, wherein this transfer comprises a velocity-synchronous stage and a velocity-asynchronous stage, repeating the transfer of said tray between said collection belt and said supply belt, wherein the velocity-synchronous stage is further reduced during each change of direction or every other change of direction, until a positioning error of said tray is detected by said controller by means of said sensor, and terminating a teaching phase and receiving in said controller a value for the time or the distance of said velocity-synchronous stage, which is at least as large as the value taken at the termination of said teaching phase.

10. Method according to claim 9, wherein said value for said velocity-synchronous stage received in said controller is at least 2% greater than said value taken at the termination of said teaching phase or at least 2% greater than the last value at which said abort was not yet triggered.

* * * * *